(12) United States Patent
Sarafianou et al.

(10) Patent No.: US 11,169,610 B2
(45) Date of Patent: Nov. 9, 2021

(54) TRACKING TECHNIQUES IN HAPTIC SYSTEMS

(71) Applicant: Ultraleap Limited, Bristol (GB)

(72) Inventors: Mantalena Sarafianou, Bristol (GB); Michele Iodice, Bristol (GB); Rafel Jibry, Bristol (GB)

(73) Assignee: ULTRALEAP LIMITED, Bristol (GB)

( * ) Notice: Subject to any disclaimer, the term of this patent is extended or adjusted under 35 U.S.C. 154(b) by 0 days.

(21) Appl. No.: 17/092,333

(22) Filed: Nov. 9, 2020

(65) Prior Publication Data
US 2021/0141458 A1 May 13, 2021

Related U.S. Application Data (60) Provisional application No. 62/933,609, filed on Nov. 11, 2019, provisional application No. 62/932,925, filed on Nov. 8, 2019.

(51) Int. Cl.
*G06F 3/01* (2006.01)
*G06F 3/0488* (2013.01)

(52) U.S. Cl.
CPC .............. *G06F 3/016* (2013.01); *G06F 3/017* (2013.01); *G06F 3/04883* (2013.01)

(58) Field of Classification Search
CPC ....... G06F 3/016; G06F 3/017; G06F 3/04883
See application file for complete search history.

(56) References Cited

U.S. PATENT DOCUMENTS

| 4,218,921 A | 8/1980 | Berge |
|---|---|---|
| 4,771,205 A | 9/1988 | Mequio |
| 4,881,212 A | 11/1989 | Takeuchi |
| 5,226,000 A | 7/1993 | Moses |

(Continued)

FOREIGN PATENT DOCUMENTS

| CA | 2470115 A1 | 6/2003 |
|---|---|---|
| CN | 101986787 | 3/2011 |

(Continued)

OTHER PUBLICATIONS

"Welcome to Project Soli" video, https://atap.google.com/#project-soli Accessed Nov. 30, 2018, 2 pages.

(Continued)

*Primary Examiner* — Michael Pervan
(74) *Attorney, Agent, or Firm* — Koffsky Schwalb LLC; Mark I. Koffsky (57) ABSTRACT

A method for object tracking is presented based on the similarity of waveforms recorded at the receiving elements of the array. A rectangular array of acoustic transducers is divided into four quadrants, on the basis that each quadrant contains a receiving element in its center. Each of the four recorded waveforms are compared against each of the remaining waveforms to identify either absolute similarity of the signal characteristics, which would denote absence of the object, or identifying a waveform being the least similar from the rest, hence pointing to a part of the array above which the object is located. Further, source localization algorithms are used for ill-posed scenarios where the distance between receivers is on the same order of magnitude of the dimensions of the tracked object and of the tracking distances.

19 Claims, 6 Drawing Sheets

(56) References Cited

U.S. PATENT DOCUMENTS

| | | | |
|---|---|---|---|
| 5,329,682 A | 7/1994 | Thurn | |
| 5,426,388 A | 6/1995 | Flora | |
| 5,477,736 A | 12/1995 | Lorraine | |
| 5,511,296 A | 4/1996 | Dias | |
| 6,029,518 A | 2/2000 | Oeftering | |
| 6,193,936 B1 | 2/2001 | Gardner | |
| 6,503,204 B1 | 1/2003 | Sumanaweera | |
| 6,647,359 B1 | 11/2003 | Verplank | |
| 6,771,294 B1 | 8/2004 | Pulli | |
| 6,772,490 B2 | 8/2004 | Toda | |
| 6,800,987 B2 | 10/2004 | Toda | |
| 7,109,789 B2 | 9/2006 | Spencer | |
| 7,182,726 B2 | 2/2007 | Williams | |
| 7,225,404 B1 | 5/2007 | Zilles | |
| 7,487,662 B2 | 2/2009 | Schabron | |
| 7,577,260 B1 | 8/2009 | Hooley | |
| RE42,192 E | 3/2011 | Schabron | |
| 8,000,481 B2 | 8/2011 | Nishikawa | |
| 8,123,502 B2 | 2/2012 | Blakey | |
| 8,269,168 B1 | 9/2012 | Axelrod | |
| 8,279,193 B1 | 10/2012 | Birnbaum | |
| 8,607,922 B1 | 12/2013 | Werner | |
| 8,833,510 B2 | 9/2014 | Koh | |
| 8,884,927 B1 | 11/2014 | Cheatham, III | |
| 9,208,664 B1 | 12/2015 | Peters | |
| 9,267,735 B2 | 2/2016 | Funayama | |
| 9,421,291 B2 | 8/2016 | Robert | |
| 9,612,658 B2 | 4/2017 | Subramanian | |
| 9,662,680 B2 | 5/2017 | Yamamoto | |
| 9,816,757 B1 | 11/2017 | Zielinski | |
| 9,841,819 B2 | 12/2017 | Carter | |
| 9,863,699 B2 | 1/2018 | Corbin, III | |
| 9,898,089 B2 | 2/2018 | Subramanian | |
| 9,945,818 B2 | 4/2018 | Ganti | |
| 9,977,120 B2 | 5/2018 | Carter | |
| 10,101,811 B2 | 10/2018 | Carter | |
| 10,101,814 B2 | 10/2018 | Carter | |
| 10,133,353 B2 * | 11/2018 | Eid | G06F 3/04815 |
| 10,140,776 B2 | 11/2018 | Schwarz | |
| 10,146,353 B1 | 12/2018 | Smith | |
| 10,469,973 B2 | 11/2019 | Hayashi | |
| 10,569,300 B2 | 2/2020 | Hoshi | |
| 2001/0033124 A1 | 10/2001 | Norris | |
| 2002/0149570 A1 | 10/2002 | Knowles | |
| 2003/0024317 A1 | 2/2003 | Miller | |
| 2003/0144032 A1 | 7/2003 | Brunner | |
| 2003/0182647 A1 | 9/2003 | Radeskog | |
| 2004/0005715 A1 | 1/2004 | Schabron | |
| 2004/0014434 A1 | 1/2004 | Haardt | |
| 2004/0091119 A1 | 5/2004 | Duraiswami | |
| 2004/0210158 A1 | 10/2004 | Organ | |
| 2004/0226378 A1 | 11/2004 | Oda | |
| 2004/0264707 A1 | 12/2004 | Yang | |
| 2005/0052714 A1 | 3/2005 | Klug | |
| 2005/0212760 A1 | 9/2005 | Marvit | |
| 2006/0085049 A1 | 4/2006 | Cory | |
| 2006/0090955 A1 | 5/2006 | Cardas | |
| 2006/0091301 A1 | 5/2006 | Trisnadi | |
| 2007/0036492 A1 | 2/2007 | Lee | |
| 2007/0177681 A1 | 8/2007 | Choi | |
| 2007/0263741 A1 | 11/2007 | Erving | |
| 2008/0012647 A1 | 1/2008 | Risbo | |
| 2008/0084789 A1 | 4/2008 | Altman | |
| 2008/0130906 A1 | 6/2008 | Goldstein | |
| 2008/0273723 A1 | 11/2008 | Hartung | |
| 2008/0300055 A1 | 12/2008 | Lutnick | |
| 2009/0093724 A1 | 4/2009 | Pernot | |
| 2009/0116660 A1 | 5/2009 | Croft, III | |
| 2009/0232684 A1 | 9/2009 | Hirata | |
| 2009/0251421 A1 | 10/2009 | Bloebaum | |
| 2009/0319065 A1 | 12/2009 | Risbo | |
| 2010/0013613 A1 | 1/2010 | Weston | |
| 2010/0030076 A1 | 2/2010 | Vortman | |
| 2010/0044120 A1 | 2/2010 | Richter | |
| 2010/0085168 A1 | 4/2010 | Kyung | |
| 2010/0103246 A1 | 4/2010 | Schwerdtner | |
| 2010/0109481 A1 | 5/2010 | Buccafusca | |
| 2010/0199232 A1 | 8/2010 | Mistry | |
| 2010/0231508 A1 | 9/2010 | Cruz-Hernandez | |
| 2010/0262008 A1 | 10/2010 | Roundhill | |
| 2010/0321216 A1 | 12/2010 | Jonsson | |
| 2011/0006888 A1 | 1/2011 | Bae | |
| 2011/0010958 A1 | 1/2011 | Clark | |
| 2011/0051554 A1 | 3/2011 | Varray | |
| 2011/0066032 A1 | 3/2011 | Vitek | |
| 2011/0199342 A1 | 8/2011 | Vartanian | |
| 2011/0310028 A1 | 12/2011 | Camp, Jr. | |
| 2012/0057733 A1 | 3/2012 | Morii | |
| 2012/0063628 A1 | 3/2012 | Rizzello | |
| 2012/0066280 A1 | 3/2012 | Tsutsui | |
| 2012/0223880 A1 | 9/2012 | Birnbaum | |
| 2012/0229400 A1 | 9/2012 | Birnbaum | |
| 2012/0229401 A1 | 9/2012 | Birnbaum | |
| 2012/0236689 A1 | 9/2012 | Brown | |
| 2012/0249409 A1 | 10/2012 | Toney | |
| 2012/0249474 A1 | 10/2012 | Pratt | |
| 2012/0299853 A1 | 11/2012 | Dagar | |
| 2012/0307649 A1 | 12/2012 | Park | |
| 2012/0315605 A1 | 12/2012 | Cho | |
| 2013/0035582 A1 | 2/2013 | Radulescu | |
| 2013/0094678 A1 | 4/2013 | Scholte | |
| 2013/0100008 A1 | 4/2013 | Marti | |
| 2013/0101141 A1 | 4/2013 | McElveen | |
| 2013/0173658 A1 | 7/2013 | Adelman | |
| 2014/0027201 A1 | 1/2014 | Islam | |
| 2014/0104274 A1 | 4/2014 | Hilliges | |
| 2014/0139071 A1 | 5/2014 | Yamamoto | |
| 2014/0168091 A1 | 6/2014 | Jones | |
| 2014/0204002 A1 | 7/2014 | Bennet | |
| 2014/0265572 A1 | 9/2014 | Siedenburg | |
| 2015/0002477 A1 | 1/2015 | Cheatham, III | |
| 2015/0005039 A1 | 1/2015 | Liu | |
| 2015/0006645 A1 | 1/2015 | Oh | |
| 2015/0007025 A1 | 1/2015 | Sassi | |
| 2015/0013023 A1 | 1/2015 | Wang | |
| 2015/0066445 A1 | 3/2015 | Lin | |
| 2015/0070147 A1 | 3/2015 | Cruz-Hernandez | |
| 2015/0070245 A1 | 3/2015 | Han | |
| 2015/0078136 A1 | 3/2015 | Sun | |
| 2015/0081110 A1 | 3/2015 | Houston | |
| 2015/0110310 A1 | 4/2015 | Minnaar | |
| 2015/0130323 A1 | 5/2015 | Harris | |
| 2015/0168205 A1 | 6/2015 | Lee | |
| 2015/0192995 A1 | 7/2015 | Subramanian | |
| 2015/0220199 A1 | 8/2015 | Wang | |
| 2015/0226537 A1 | 8/2015 | Schorre | |
| 2015/0226831 A1 | 8/2015 | Nakamura | |
| 2015/0248787 A1 | 9/2015 | Abovitz | |
| 2015/0258431 A1 | 9/2015 | Stafford | |
| 2015/0277610 A1 | 10/2015 | Kim | |
| 2015/0304789 A1 | 10/2015 | Babayoff | |
| 2015/0331576 A1 | 11/2015 | Piya | |
| 2015/0332075 A1 | 11/2015 | Burch | |
| 2016/0019762 A1 | 1/2016 | Levesque | |
| 2016/0019879 A1 | 1/2016 | Daley | |
| 2016/0026253 A1 | 1/2016 | Bradski | |
| 2016/0044417 A1 | 2/2016 | Clemen, Jr. | |
| 2016/0124080 A1 | 5/2016 | Carter | |
| 2016/0138986 A1 | 5/2016 | Carlin | |
| 2016/0175701 A1 * | 6/2016 | Froy | G06F 3/01 463/32 |
| 2016/0175709 A1 * | 6/2016 | Idris | A63F 13/25 463/32 |
| 2016/0189702 A1 | 6/2016 | Blanc | |
| 2016/0242724 A1 | 8/2016 | Lavallee | |
| 2016/0246374 A1 | 8/2016 | Carter | |
| 2016/0249150 A1 | 8/2016 | Carter | |
| 2016/0291716 A1 | 10/2016 | Boser | |
| 2016/0306423 A1 | 10/2016 | Uttermann | |
| 2016/0320843 A1 | 11/2016 | Long | |
| 2016/0339132 A1 | 11/2016 | Cosman | |
| 2017/0002839 A1 | 1/2017 | Bukland | |
| 2017/0004819 A1 | 1/2017 | Ochiai | |
| 2017/0018171 A1 | 1/2017 | Carter | |

(56) References Cited

U.S. PATENT DOCUMENTS

| | | |
|---|---|---|
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2018/0039333 A1 | 2/2018 | Carter |
| 2018/0074580 A1 | 3/2018 | Hardee |
| 2018/0081439 A1 | 3/2018 | Daniels |
| 2018/0139557 A1 | 5/2018 | Ochiai |
| 2018/0151035 A1 | 5/2018 | Maalouf |
| 2018/0166063 A1 | 6/2018 | Long |
| 2018/0304310 A1 | 10/2018 | Long |
| 2018/0350339 A1 | 12/2018 | Macours |
| 2018/0361174 A1 | 12/2018 | Radulescu |
| 2019/0038496 A1 | 2/2019 | Levesque |
| 2019/0091565 A1 | 3/2019 | Nelson |
| 2019/0175077 A1 | 6/2019 | Zhang |
| 2019/0196578 A1 | 6/2019 | Iodice |
| 2019/0197840 A1 | 6/2019 | Kappus |
| 2019/0197842 A1 | 6/2019 | Long |
| 2019/0235628 A1 | 8/2019 | Lacroix |
| 2020/0080776 A1 | 3/2020 | Kappus |

FOREIGN PATENT DOCUMENTS

| | | |
|---|---|---|
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| EP | 309003 | 3/1989 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2014181084 A1 | 11/2014 |
| WO | 2015006467 | 1/2015 |
| WO | 2015039622 | 3/2015 |
| WO | 2015127335 | 8/2015 |
| WO | 2016007920 | 1/2016 |
| WO | 2016095033 A1 | 6/2016 |
| WO | 2016132144 | 8/2016 |
| WO | 2016137675 | 9/2016 |
| WO | 2016162058 | 10/2016 |
| WO | 2017172006 | 10/2017 |
| WO | 2020049321 A2 | 3/2020 |

OTHER PUBLICATIONS

A. Sand, Head-Mounted Display with Mid-Air Tactile Feedback, Proceedings of the 21st ACM Symposium on Virtual Reality Software and Technology, Nov. 13-15, 2015 (8 pages).
Alexander, J. et al. (2011), Adding Haptic Feedback to Mobile TV (6 pages).
Ashish Shrivastava et al., Learning from Simulated and Unsupervised Images through Adversarial Training, Jul. 19, 2017, pp. 1-16.
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Corrected Notice of Allowability dated Jun. 21, 2019 for U.S. Appl. No. 15/966,213 (2 pages).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
Diederik P. Kingma et al., Adam: A Method for Stochastic Optimization, Jan. 30, 2017, pp. 1-15.
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO Office Action for EP16708440.9 dated Sep. 12, 2018 (7 pages).
EPSRC Grant summary EP/J004448/1 (dated 2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of (56) References Cited

OTHER PUBLICATIONS

Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference:Jun. 27-Jul. 2, 2004, 9 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Hilleges et al. Interactions in the air: adding further depth to interactive tabletops, UIST '09: Proceedings of the 22nd annual ACM symposium on User interface software and technology Oct. 2009 pp. 139-148.
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
Hua J, Qin H., Haptics-based dynamic implicit solid modeling, IEEE Trans Vis Comput Graph. Sep.-Oct. 2004;10(5):574-86.
Iddan, et al., "3D Imaging in the Studio (and Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for Application No. PCT/GB2018/053738, dated Apr. 11, 2019, 14 pages.
International Search Report and Written Opinion for Application No. PCT/GB2018/053739, dated Jun. 4, 2019, 16 pages.
International Search Report and Written Opinion for Application No. PCT/GB2019/050969, dated Jun. 13, 2019, 15 pages.
International Search Report and Written Opinion for Application No. PCT/GB2019/051223, dated Aug. 8, 2019, 15 pages.
International Search Report and Written Opinion for Application No. PCT/GB2019/052510, dated Jan. 14, 2020, 25 pages.
ISR and WO for PCT/GB2020/050013 (dated Jul. 13, 2020) (20 pages).
ISR and WO for PCT/GB2020/050926 (dated Jun. 2, 2020) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 20 06 14th Symposium on Alexandria, VA, USA Mar. 25-26, 2006, Piscataway, NJ, USA,IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 3019, 10 pages.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
K. Jia, Dynamic properties of micro-particles in ultrasonic transportation using phase-controlled standing waves, J. Applied Physics 116, n. 16 (2014) (12 pages).
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Sysgtems (NIPS 2016), Barcelona, Spain. Aug. 22, 2016, pp. 1-15.
Krim, et al., "Two Decades of Array Signal Processing Research— The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mandi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Marin, About LibHand, LibHand-A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).

(56) References Cited

OTHER PUBLICATIONS

Marzo et al., Holographic acoustic elements for manipulation of levitated objects, Nature Communications DOI: I0.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 17, 2020 for U.S. Appl. No. 15/210,661 (pp. 1-9).
Notice of Allowance dated May 30, 2019 for U.S. Appl. No. 15/966,213 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Notice of Allowances dated Oct. 1, 2020 for U.S. Appl. No. 15/897,804 (pp. 1-9).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pags 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 22, 2019 for U.S. Appl. No. 16/160,862 (pp. 1-5).
Office Action dated Dec. 11, 2019 for U.S. Appl. No. 15/959,266 (pp. 1-15).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Mar. 20, 2020 for U.S. Appl. No. 15/210,661 (pp. 1-10).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
OGRECave/ogre—GitHub: ogre/Samples/Media/materials at 7de80a7483f20b50f2b10d7ac6de9d9c6c87d364, Mar. 26, 2020, 1 page.
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, dated Apr. 12, 2019, 14 pages.
Partial ISR for Application No. PCT/GB2020/050013 dated May 19, 2020 (16 pages).
PCT Partial International Search Report for Application No. PCT/GB2018/053404 dated Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rocchesso et al.,Accessing and Selecting Menu Items by In-Air Touch, ACM CHItaly'19, Sep. 23-25, 2019, Padova, Italy (9 pages).
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).

(56) References Cited

OTHER PUBLICATIONS

Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Sylvia Gebhardt, Ultrasonic Transducer Arrays for Particle Manipulation (date unknown) (2 pages).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-362.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Vincent Lepetit et al., Model Based Augmentation and Testing of an Annotated Hand Pose Dataset, ResearchGate, https://www.researchgate.net/publication/307910344, Sep. 2016, 13 pages.
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Aoki et al., Sound location of stero reproduction with parametric loudspeakers, Applied Acoustics 73 (2012) 1289-1295 (7 pages).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Bortoff et al., Pseudolinearization of the Acrobot using Spline Functions, IEEE Proceedings of the 31st Conference on Decision and Control, Sep. 10, 1992 (6 pages).
Corrected Notice of Allowability dated Jan. 14, 2021 for U.S. Appl. No. 15/897,804 (pp. 1-2).
ISR and WO for PCT/GB2020/052545 (dated Jan. 27, 2021) (14 pages).
ISR and WO for PCT/GB2020/052829 (dated Feb. 1, 2021) (15 pages).
Office Action dated Dec. 7, 2020 for U.S. Appl. No. 16/563,608 (pp. 1-8).
Office Action dated Mar. 11, 2021 for U.S. Appl. No. 16/228,767 (pp. 1-23).
Search Report by EPO for EP 17748466 dated Jan. 13, 2021 (16 pages).
Wang et al., Device-Free Gesture Tracking Using Acoustic Signals, ACM MobiCom '16, pp. 82-94 (13 pages).
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).

(56) References Cited

OTHER PUBLICATIONS

ISR & WO for PCT/GB2020/052545 (dated Jan. 27, 2021) 14 pages.
ISR and WO for PCT/GB2020/052544 (dated Dec. 18, 2020) (14 pages).
ISR for PCT/GB2020/052546 (dated Feb. 23, 2021) (14 pages).
ISR for PCT/GB2020/053373 (dated Mar. 26, 2021) (16 pages).
Notice of Allowance dated Apr. 20, 2021 for U.S. Appl. No. 16/563,608 (pp. 1-5).
Notice of Allowance dated Jun. 25, 2021 for U.S. Appl. No. 15/396,851 (pp. 1-10).
Office Action dated Jun. 25, 2021 for U.S. Appl. No. 16/899,720 (pp. 1-5).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).

* cited by examiner

TRACKING TECHNIQUES IN HAPTIC SYSTEMS

PRIOR APPLICATIONS

This application claims the benefit of: (1) U.S. Provisional Patent Application No. 62/932,925 filed on Nov. 8, 2019; and (2) U.S. Provisional Patent Application No. 62/933,609, filed on Nov. 11, 2019, both of which are incorporated by reference in its entirety.

FIELD OF THE DISCLOSURE

The present disclosure relates generally to improved techniques in tracking within haptic systems consisting of transducer arrays.

BACKGROUND

An array of transducers can be used to create a continuous acoustic field, in the form of a distribution of sound energy. This field can have a number of applications including but not limited to generation of haptics in mid-air, haptic feedback and object levitation in air.

The acoustic field can be controlled through spatial points (the control points), to which an amplitude and phase value are assigned. The aforementioned array of transducers can then be used to define and generate the acoustic field which will exhibit the selected amplitude and phase properties at the various control points.

Through the variation of the amplitude and phase characteristics of the control points, different acoustic fields can be generated for any of the above applications. Consider, for instance, the case of a system for mid-air haptics generation and feedback. The user's hand gesture can be identified by the array of transducers and used as a means of a response (feedback) to the system for a subsequent action to take place by the haptics system.

The perceived "hand gesture" consist of two main parts; the tracking of the hand in space followed for the identification of the performed gesture. The former part can be determined through the acoustic field generated by the array.

Prior approaches exploit the characteristics present in specific acoustic fields generated by the array of transducers towards hand tracking. Thus, their use in successfully tracking the hand is limited; restricted to the uniquely generated acoustic fields specified in the abovementioned documents. Their performance, resolution and accuracy in hand tracking is further limited by certain conditions applied to the generated acoustic fields, reducing their ability to work in synergy with other techniques for hand tracking. Finally, none of the above approaches handle the task of detecting the absence or presence of a hand above the array.

The proposed method and its variants can be used considering any generated acoustic field, since its basis is the similarity of recorded waveforms from symmetrically located receiving elements. In addition, the use of waveform similarity is further exploited to discern the presence or absence of the reflector in the tracking space, which has not been dealt with by prior patent fillings.

The approach proposed here aims at determining the presence or absence of an object (the hand) and its rough location, when placed at a distance above the array taking advantage of the array design characteristics. Namely, the symmetrical location of the receiving elements within the array can be used to establish the presence or absence of the hand and subsequently provide information as to its coarse location in the space above the array.

Further, acoustic tracking with phased arrays can be achieved in various ways, some of which involve the use of phase and/or frequency modulation, e.g. the use of a pseudo-random sequence of symbols encoded in the phase modulation of the acoustic carrier frequency, or a long wavelength modulation. Source localization estimation techniques are usually based on the measurement of the time-of-flight (TOF), which is the time the acoustic wave takes to travel off the reflected surface back to some remote location. Traditionally, trilateration or multilateration (MLAT) are used to estimate the three-dimensional location of a source. They are processes of determining absolute or relative locations of points by measurement of distances from known strategic points, using the geometry of circles, spheres or triangles. They might involve the minimization of a cost function using gradient descent to pinpoint the precise position of the reflector, which corresponds to the global minimum of the cost function.

Although the mentioned techniques can be used for acoustic tracking of an object, e.g. a bare hand, they suffer fundamental limitations. Firstly, trilateration and MLAT require at least four reliable measurements of TOF, in case of noisy measurements. Moreover, traditional MLAT applications (i.e., surveillance techniques or Ground Positioning Systems) all operate with the assumption that the emission (or reception) of radiated energy is coming from a common point-like source.

This disclosure describes source localization algorithms that overcome the limitations of traditional source localization techniques. In particular, the proposed algorithms are capable of performing MLAT in situations where common point-like source approximation is violated. Moreover, they estimate the position of a reflector with as few as two receivers, by constraining one of the three dimensions of the optimization or solver step. The proposed disclosure is intended, but not limited, to ill-posed scenarios where the distance between receivers is on the same order of magnitude of the dimensions of the tracked object and of the tracking distances.

Finally, the disclosure describes a learning process that enables the location of the tracked object to be estimated, or its trajectory to be classified, without the need of an optimizer, by using the raw or post-processed waveforms.

SUMMARY

A method for object tracking is presented based on the similarity of waveforms recorded at the receiving elements of the array. A rectangular array of transducers is divided into four parts (quadrants), on the basis that each quadrant contains a receiving element in its center. Each of the four recorded waveforms are compared against each of the remaining waveforms to identify either absolute similarity of the signal characteristics, which would denote absence of the object, or identifying a waveform being the least similar from the rest, hence pointing to a part of the array (quadrant) above which the object is located.

This application also describes source localization algorithms that overcome the limitations of traditional source localization techniques. In particular, the proposed algorithms are capable of performing MLAT in situations where common point-like source approximation is violated. Moreover, they estimate the position of a reflector with as few as two receivers, by constraining one of the three dimensions of the optimization or solver step. The application is intended, but not limited, to ill-posed scenarios where the distance between receivers is on the same order of magnitude of the dimensions of the tracked object and of the tracking distances.

Finally, the application describes a learning process that enables the location of the tracked object to be estimated, or its trajectory to be classified, without the need of an optimizer, by using the raw or post-processed waveforms.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Coarse Estimation of the (x,y) Sub-Space for Hand Tracking

The proposed techniques aim at reducing the (x,y) domain where the object would be located to a reduced sub-space (quadrant). Either the correlation coefficient or the covariance calculations are used as a means to determine the lack of signal dependency or a strong signal dependency. Consequently, the absence or presence of the object can be determined respectively in one of the four quadrants. In addition, mapping the information of the index of the selected quadrant into specific (x,y) coordinate values is also considered.

A. Simplified Approach

Figure 1:
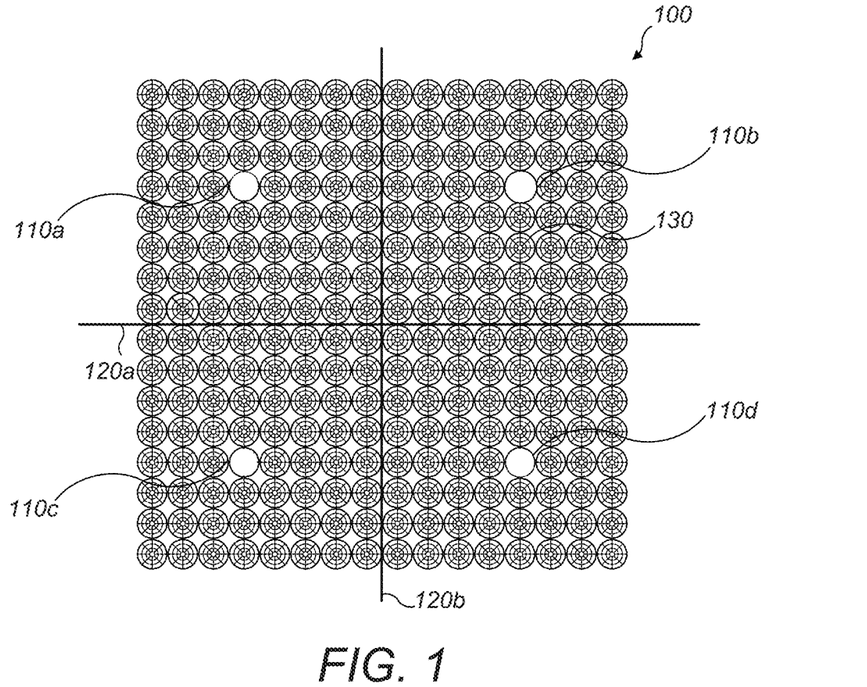
FIG. 1 shows a schematic of transducers for a simplified approach to hand tracking.

Turning to FIG. 1, shown is a schematic 100 of an array of transducers 130 divided into four equivalent areas as marked by the intersecting lines 120a, 120b, creating quadrants. Each quadrant contains a receiving element as marked by the white dots 110a, 110b, 110c, 110d surrounded by transmitting elements. The broader assumption here is that each receiver is recording the waveform reflected by an object in its vicinity (i.e. within the quadrant), thus, for every receiving element, only the neighboring (line-of-sight) eight (8) transmitting elements are activated.

For every received signal $x_i(t)$, where i (and j subsequently used) corresponds to the index of the receiving transducers, define the matrix R as below:

$$R = \begin{bmatrix} r_{i=1,j=1} & \cdots & r_{i=1,j=4} \\ \vdots & \ddots & \vdots \\ r_{i=4,j=1} & \cdots & r_{i=4,j=4} \end{bmatrix} \quad (1)$$

Each element of the above matrix, $r_{ij}$ corresponds to the Pearson correlation coefficient defined by the formula below:

$$r_{ij} = \frac{\text{cov}(x_i, x_j)}{\sigma_{x_i} \sigma_{x_j}} \quad (2)$$

where the numerator corresponds to the covariance between the i-th and j-th signals and $\sigma_i$ and $\sigma_j$ corresponds to their respective standard deviation. A value of $r_{ij}$ close to 1 will denote a highly correlated pair of signals, whereas a value approximating 0 will indicate a low degree of correlation between the two signals.

The matrix R will be symmetric with the diagonal elements being equal to 1 (corresponding to the auto-covariance of each signal) and thus by finding the column j (or row i) with the minimum mean value, the index of the least correlated signal out of the four can be determined. This will translate to the quadrant in FIG. 1 containing the object.

Matrix R containing elements close to one (1) will denote the good correlation between all signal pairs, and thus the absence of an object above the array.

B. Generalized Approach

Although the above proposed novel methodology can determine the presence and absence of an object and identify its coarse location in terms of the specific quadrant, this is done at the cost of using a reduced set of transmitting elements. In addition, the domain of identification may be limited within the area of a 16×16 cm space corresponding to the array aperture.

Figure 2:
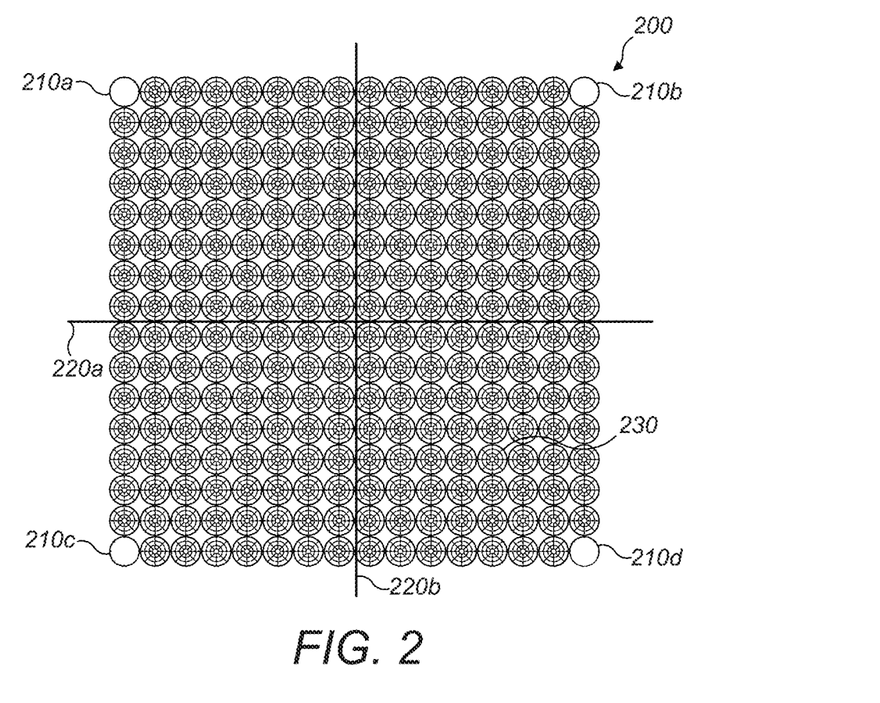
FIG. 2 shows a schematic of transducers for a generalized approach to hand tracking.

To tackle the above two challenges, a novel generalized method was also developed considering the array configuration as shown in FIG. 2. Shown in FIG. 2 is a schematic 200 where the area of the array aperture 230 is divided into four parts as marked by the intersecting lines 220a, 220b. The receiving elements are located at the corners of the array, as marked by the white dots 210a, 210b 210c, 210d. Thus, the algorithm's coverage in terms of object tracking is greater. Moreover, all the transmitting elements are used for the excitation of the array, rather than a reduced set as discussed in the simplified approach.

A similarity vector $S_{cov}$ is defined by the equation below:

$$S_{cov} = [\text{cov}(x_i, x_{tx}) \ldots \text{cov}(x_{i=4}, x_{tx})] \quad (3)$$

where each i-th vector element corresponds to the covariance between the recorded waveform from the i-th receiving element and the transmitted signal denotes in (3) as $x_{tx}$. In order to determine the presence or absence of the object, the following condition is tested:

$$\max(|S_{cov}|) < \text{threshold} \quad (4)$$

The |...| operator denotes the absolute value, whereas max(...) is the maximum value within the vector $S_{cov}$. The threshold value was determined empirically based on the maximum absolute value of the vector $S_{cov}$ in a measurement, where no object was suspended above array (reference measurement).

If the condition in (4) is satisfied, then there is no object present. If this condition fails, then there is an object present above the array, over a specific quadrant, based on the index of the vector element having the global maximum absolute covariance value (corresponding to the left term in equation (4)).

Note that for both the simplified approach and generalized method the selected quadrant can be mapped to a (x,y) coordinate pair using the (x,y) coordinates of the receiving element within the selected quadrant.

C. Additional Disclosure

1. A technique for using the signal similarity to localize an object in a 2-D space A method in paragraph 1 in which the array symmetry is used to localize an object.

A method in paragraph 1 in which the receiving elements are embedded within the array.

A method in paragraph 1 in which in a subset of transmitting elements, namely the neighboring ones to each receiver, are used to generate an acoustic field yielding recorded waveforms.

A method in paragraph 1 in which the Pearson correlation coefficient is employed to harvest the received signal similarity.

A method in paragraph 1 in which the absence of an object is determined from the similar values contained in the matrix of correlation coefficient parameters.

A method in paragraph 1 in which the coarse location (in terms of a quadrant) is established from the lag of the minimum mean of the matrix R either along the matrix columns or rows.

A method in paragraph 1 in which the coarse estimation of the object in terms of a quadrant can be translated to a (x,y) coordinate pair using the (x,y) coordinates of the receiving element within the selected quadrant.

2. A technique for using the signal similarity to localize an object in a 2-D space.

A method in paragraph 2 in which the array symmetry is used to localize an object.

A method in paragraph 2 in which the receiving elements at the corners of the array for increased coverage beyond the array area.

A method in paragraph 2 in which the covariance calculation is used to harvest the signal similarity.

A method in paragraph 2 in which a template signal, the excitation signal, is used to compute the covariance with every received waveform.

A method in paragraph 2 in which the absence of an object is based on the satisfaction of the condition that the maximum of the absolute value within the similarity vector being lower than an empirically established value of the generated acoustic field through a reference measurement.

A method in paragraph 2 in which the maximum of the absolute value within the similarity vector defines the presence of an object, along with its coarse location (quadrant).

A method in paragraph 2 in which the coarse estimation of the object in terms of a quadrant can be translated to a (x,y) coordinate pair using the (x,y) coordinates of the receiving element within the selected quadrant.

II. Source Localization Algorithms for Phased Arrays Using Reduced Dimension-Fitting Techniques A. Introduction Localization is one of the most important tasks in a range of applications, from future wireless sensors to wearable devices and headset to autonomous driving. There are a variety of different algorithm for localization and tracking of a mobile object, which we can divide in four major groups:

Distance-based localization: the distances between receivers and the object are known;

Angle-based localization: based on the measured angle of arrival;

Received signal strength-based localization: based on the strength (power) of the received signal; and Hybrid approaches.

Described herein is a different approach to hybrid localization algorithms. In particular, it focuses on the case were N anchor nodes (i.e. receivers with three-dimensional locations) in a system conveys the distance measurement to yield the location of the mobile object through MLAT.

1. Multilateration

MLAT is a surveillance technique based on the measurement of the difference in distance to two stations at known locations by broadcast signals at a known time. MLAT relies on multiple measurements to estimate the location of an object. For the purposes of this disclosure, the objective consists of adjusting the parameters of a model function (or cost function) to best fit a data set. The model function has the following form:

$$f(r) = \sqrt{(x_i - x_s)^2 + (y_i - y_s)^2 + (z_i - z_s)^2} - d_i \quad (5)$$

where $r = (x_s, y_s, z_s)$ is the vector of coordinates of the imaginary source (i.e. the "acoustic center"), $x_i, y_i, z_i$ are the coordinates of the i-th receiving transducer and $d_i$ is defined as it follows:

$$d_i = (T_i \cdot c) \quad (6)$$

where $T_i$ is the receive time (time-of-flight or TOF) of the i-th anchor node (i.e., receiver) and c is the speed of sound.

The least squares method finds its optimum when the sum S of squared residual is a minimum:

$$S = \sum_{i=1}^{N} (f(r))^2 \quad (7)$$

where N is the number of anchor nodes.

2. Gradient Descent (First Order Method)

If we define the term:

$$B_i = \sqrt{(x_i - x_s)^2 + (y_i - y_s)_2 + (z_i - z_s)^2} \quad (8)$$

the vector gradient $$\nabla f = \left( \frac{\partial f}{\partial x}, \frac{\partial f}{\partial y}, \frac{\partial f}{\partial Z} \right)$$

will be:

$$\nabla f = \begin{bmatrix} \sum_{i=1}^{N} 2 \cdot \frac{(B_i - d_i) \cdot (x_i - x_s)}{B_i} \\ \sum_{i=1}^{N} 2 \cdot \frac{(B_i - d_i) \cdot (y_i - y_s)}{B_i} \\ \sum_{i=1}^{N} 2 \cdot \frac{(B_i - d_i) \cdot (z_i - z_s)}{B_i} \end{bmatrix} \quad (9)$$

where i refers to the i-th anchor node.

Then, a loop of m iterations updates the parameters of the model functions according to the following expression:

$$r^* = r - \varepsilon \cdot \nabla f \quad (10)$$

where r* is the updated vector of estimated position coordinates and $\varepsilon$ is the step size, or learning rate, arbitrarily chosen. The vector gradient is updated m times until it becomes small (less than 10e-6 as a rule of thumb).

A minimum of three anchor nodes are needed to estimate the position in a 3D space. The estimation accuracy increases as a function of the number of anchor nodes.

3. Gauss-Newton Method (Second Order Method)

A different approach to solve a minimization problem is the Gauss-Newtown algorithm, which can be view in terms of least-squares problems. While the cost function remains that of equation (6), the algorithm proceeds by iterations to update the initial guess, as it follows:

$$r^* = r - (A^T \cdot A)^{-1} \cdot A^T \cdot f(r) \quad (11)$$

where the entries of the Jacobian matrix A are:

$$A_{ij} = \frac{\partial f_i(r)}{\partial r_j} \quad (12)$$

and j goes from 1 to 3.

Gauss-Newton method allows for convergence along a more direct path and it converges faster than gradient descent.

B. Rationale

The proposed algorithms, which will be introduced in the next section, are intended for ill-posed problems of source localization and object tracking, using sound energy. More specifically, they try to address some of the limitations of using traditional gradient descent optimization methods, like those introduced in section A. In fact, the latter operate under the assumption of common point-like source approximation, and require, at minimum, three distance measurements if the measurements are exact, or four if the measurements are affected by noise or inaccuracies, to find a solution.

The proposed algorithms localize the stronger source of energy with as few as two receivers, by deriving one of the three dimensions from direct TOF measurements. In fact, in some application as few as two receivers are unambiguously illuminated by reflected energy and hence are receiving energy from the same tracked reflector. Moreover, using only two receivers reduces hardware costs and the computational effort required.

The proposed algorithms are hybrid algorithms between distance-based and power-based ones. They are developed under the assumption of equal distance between emitter-source and source-receiver.

Consider a coplanar array of receivers as an example scenario. Direct TOF measurements can provide the range in three steps:

Halving the TOF estimated by each of the N receiving channel;

Estimating the halved distances from the respective TOF estimates.

Performing a weighted average operation of range with power from the N receivers, using the channel power $P_i$ as the weights, as it follows:

$$R = \frac{\sum_{i=1}^{N} R_i \cdot P_i}{\sum_{i=1}^{N} P_i} \quad (13)$$

Where $R_i$ is the halved distance and $P_i$ is the power associated to the i-th channel, for the considered time-window.

With a reliable estimation of one dimension using basic TOF from all the receivers, it is possible to assume the latter as the input for a solver or optimizer to resolve the other two dimensions, e.g. the minimization of a cost function. This removes the need for the optimizer to search within a wider space. The problem of minimizing a cost function can be a three-dimensional if one of the three coordinates is always kept at a constant value, or can become two-dimensional if the constrained dimension is projected over the two unknown dimensions.

The benefits of this approach would be a reduced number of receivers needed (up to only two), and a reduced number of unknowns of the optimization problems. A potential drawback is that any noise and inaccuracies in the estimation of the first dimension with basic TOF would lead to noisy estimations for the remaining coordinates.

Inferring or assuming one dimension from basic TOF measurements would simplify and accelerate the convergence of the optimization problem, narrowing the search of the global minimum. The theoretical minimum number of receiving channels required for these kind of technique is two.

1. Proposed Algorithm No. 1

Since one of the three coordinates (e.g. Z) is known from direct TOF measurements, the proposed algorithm constrains it by forcing the estimate at each iteration. By doing so, a minimum of only two true, valid TOF measurements are needed to minimize the 3-dimensional cost function.

Figure 3:
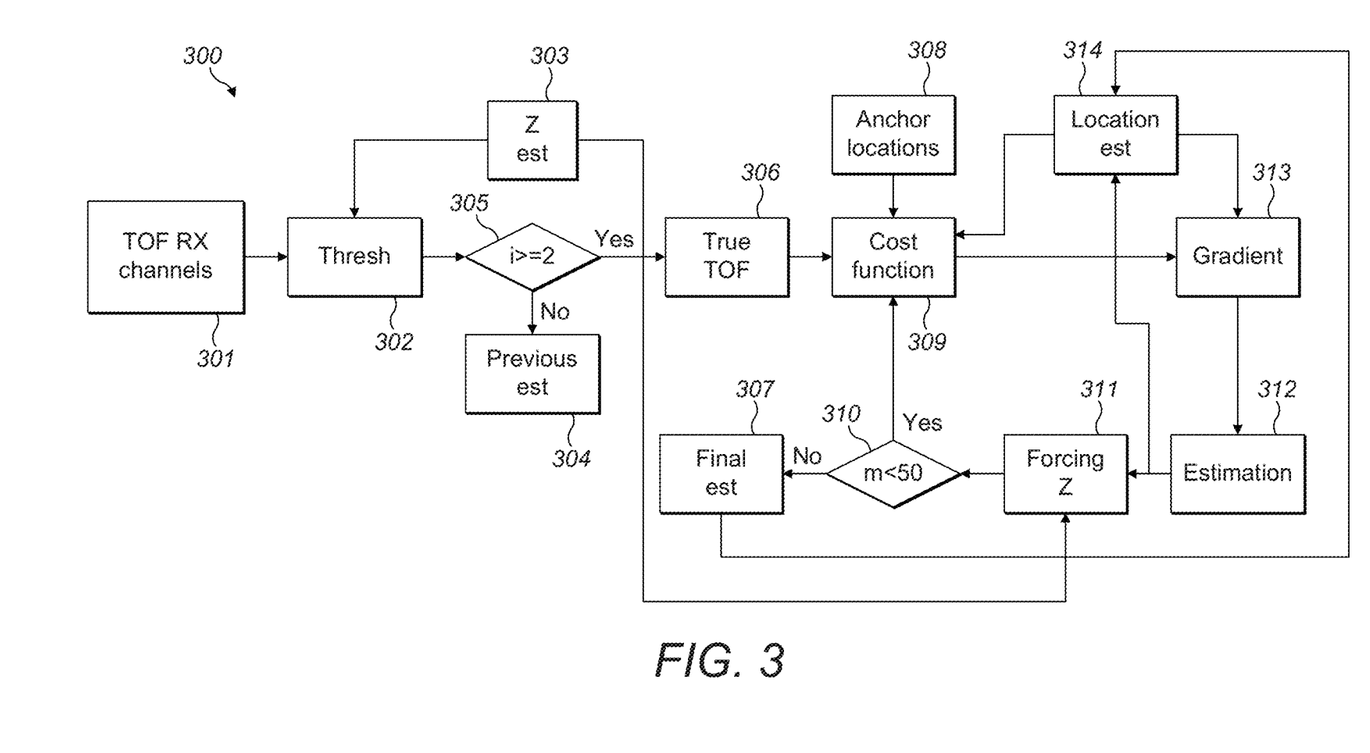
FIG. 3 shows a diagram of a first source localization algorithm.

In FIG. 3, a diagram 300 shows that input blocks are: TOF RX Channels 301, Z est[imate] 303, Previous est[imate] 304, Anchor locations 308, Location est[imate] 314. Output blocks are: Thresh(old) 302, True TOF 306, Cost function 309, Gradient 313, Final est[imate] 307, Forcing Z 311, Estimation 312. Decision stages are i>=2 305, m<50 310.

FIG. 3 depicts the flow diagram 300 of the proposed algorithm No. 1. In the example scenario, the Z-coordinate is known from direct TOF measurements, as explained in the previous section. The system is composed of N anchor nodes. The TOF from the receiving (RX) channels 301 are the input for the algorithm. Based on the corresponding estimation of Z 303, a decision stage 305 discards the channels which are not associated to the reflector. This decision is based on a threshold 302 (e.g. ±20% of the estimated Z). If the remaining number of channels i is more or equal to two, then the gradient 313 of the cost function 309 of the true TOF 306 described by equation (5) is calculated, considering a random initialization for the location estimation 314 and the known anchors' locations 308. The Jacobian matrix is calculated as per equation (12) and the location of the imaginary source updated as per equation (11) for each iteration 313. The Z-coordinate is forced back 311 to the original estimation 312 at each iteration 310, 309. Finally, when the maximum number of iterations is reached (e.g. 50 iterations) 310 the final source location estimation 307 is delivered. The final estimation serves as the initialization of the successive minimization problem.

If the remaining number of channels i is less than 2, the previous estimate 304 is used.

2. Proposed Algorithm No. 2

If the third coordinate (e.g. Z) is removed and the system is solved for X and Y only, the minimization problem becomes a 2-dimensional problem, if the TOF projected to the perpendicular degrees of freedom is used. By doing so, a minimum of only two anchor nodes are needed to estimate the position in the 3D space, with direct TOF measurements providing the third coordinate. The main benefit of reducing the minimization problem to a 2-D problem is that computational effort may be reduced by approximately ¼.

Figure 4:
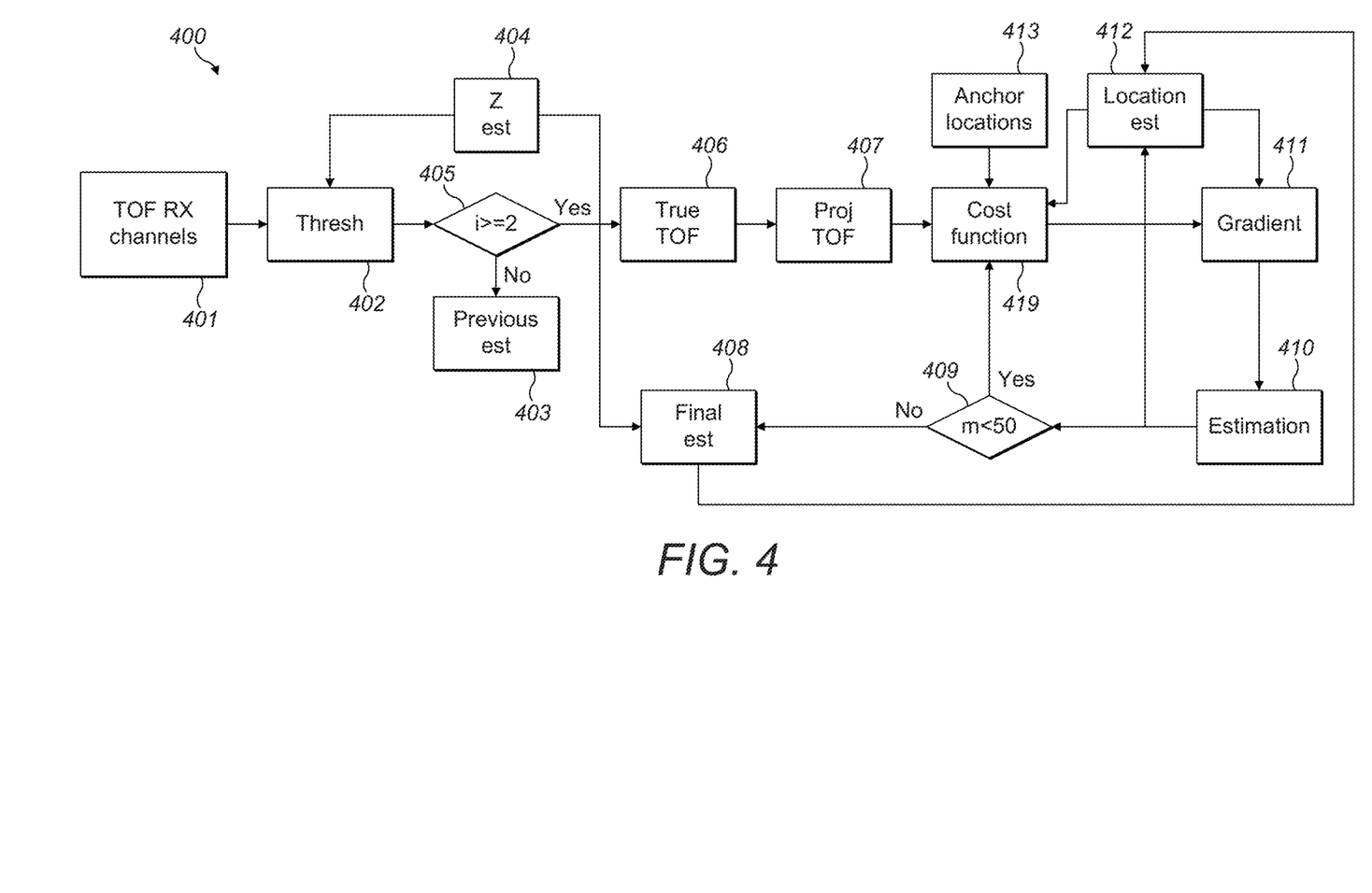
FIG. 4 shows a diagram of a second source localization algorithm.

In FIG. 4, a diagram 400 shows that, input blocks are: TOF RX Channels 401, Z est[imate] 404, Previous est[imate] 403, Anchor locations 413, Location est[imate] 412. Output blocks are: Thresh(old) 402, True TOF 406, Proj[ected] TOF 407, Cost function 419, Gradient 411, Final est[imate] 408, Estimation 410. Decision stages are i>=2 405, m<50 409.

FIG. 4 depicts the flow diagram of the proposed algorithm No. 2. In the example scenario, the Z-coordinate is known from direct TOF measurements, as explained in the previous section. The system is composed of N receivers. The TOF from the receiving (RX) channels 401 are the input for the algorithm. Based on the corresponding estimation of Z 404, a decision stage discards the channels which are not associated to the reflector. This decision is based on a threshold (e.g. ±20% of the estimated Z) 402. If the remaining number of channels i is more or equal to two 405, then the TOF are projected to the perpendicular degrees of freedom 406, 407. Then, the gradient of the following two-dimensional cost function is calculated:

$$f(r) = \sqrt{(x_i - s)^2 + (y_i - y_s)^2} - p_i \quad (14)$$

where $r = (x_s, y_s)$ is the 2-dimensional coordinates vector of the imaginary source, $x_i$, $y_i$ are the coordinates of the i-th receiving transducer and $p_i$ is defined as follows:

$$p_i = \sqrt{d_i^2 - \left(\frac{R}{c}\right)^2} \quad (15)$$

The location estimation 412 is randomly initialized. The Jacobian matrix is calculated as per equation (12) and the location of the imaginary source updated as per equation (11) for each iteration 419, 411, 410, considering a random initialization for the location estimation 412 and the known anchors' locations 413. Finally, when the maximum number of iterations is reached (e.g. 50 iterations) 409 the final source location estimation 408 is delivered. The final estimation serves as the initialization of the successive minimization problem.

If the remaining number of channels i is less than 2, the previous estimate 403 is used.

C. Weighted Gradient Descent

Weighting the distance measurements according to the confidence of each anchor node limits the effect of measurement error and increase the signal-to-noise-ratio of the estimation. A model function including different weights could be expressed as follows:

$$S = \sum_{i=1}^{N} w_i \cdot (f(r))^2 \quad (16)$$

Where $w_i$ is the weight, or confidence, associated to the i-th anchor node.

Suitable confidence factors can be the channels' power, the correlation coefficients and the peak-to-peak amplitudes of the received waveforms, or of the demodulated wavelengths (in case phase modulation is adopted), of each anchor node.

D. Results from Numerical Simulations

This section introduces the results on numerical simulations performed with the traditional algorithm and with the proposed algorithms. In all the numerical simulations, the Gauss-Newton method is utilized.

Figure 5A:
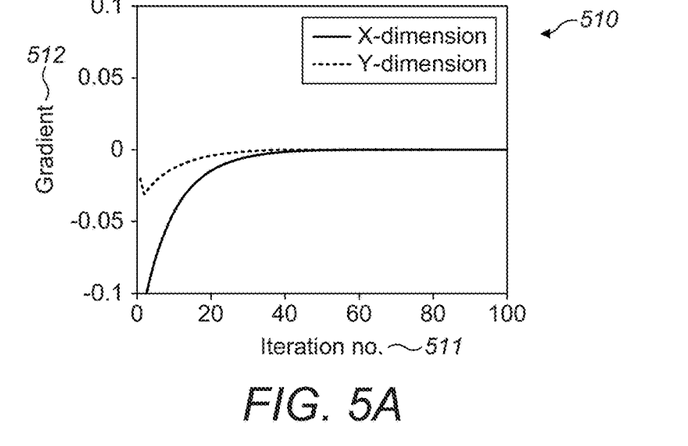
FIGS. 5A, 5B, and 5C show numerical simulations performed with 3 anchor nodes and 100 iterations.
Figure 5B:
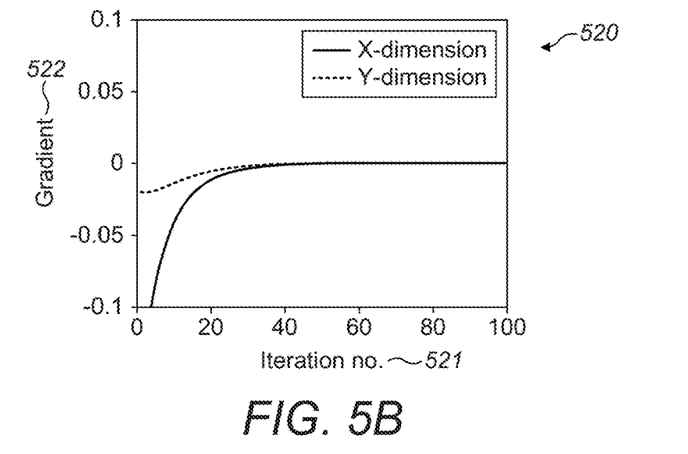
Figure 5C:
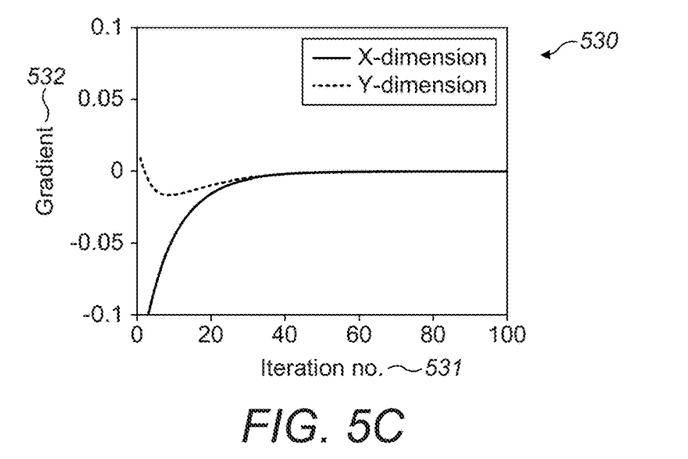

FIGS. 5A, 5B, 5C show numerical simulations performed with 3 anchor nodes and 100 iterations. These simulation show that the proposed algorithms succeed in finding the global minimum of the cost function, with a direct path but with less computational power and number of iterations required compared to traditional MLAT algorithm, as explained in the previous sections.

Specifically, FIG. 5A shows a simulation using "classic" MLAT 510 with the x-axis being the iteration number 511 and the y-axis is the gradient 512. FIG. 5B shows a simulation using Algorithm No. 1 520 with the x-axis being the iteration number 521 and the y-axis is the gradient 522. FIG. 5C shows a simulation using Algorithm No. 2 530 with the x-axis being the iteration number 531 and the y-axis is the gradient 532.

In all the three cases 510, 520, 530 the minimization problem is converging to the true value.

Figure 6A:
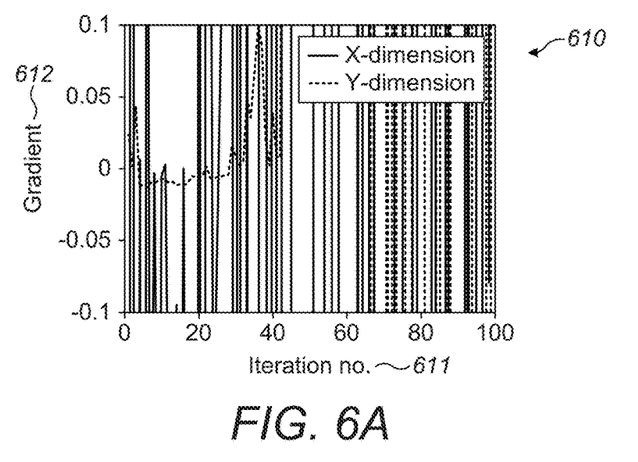
FIGS. 6A, 6B, and 6C show numerical simulations performed with 2 anchor nodes and 100 iterations.
Figure 6B:
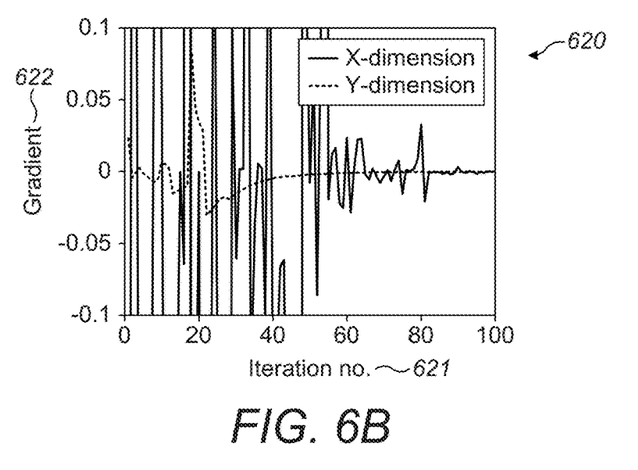
Figure 6C:
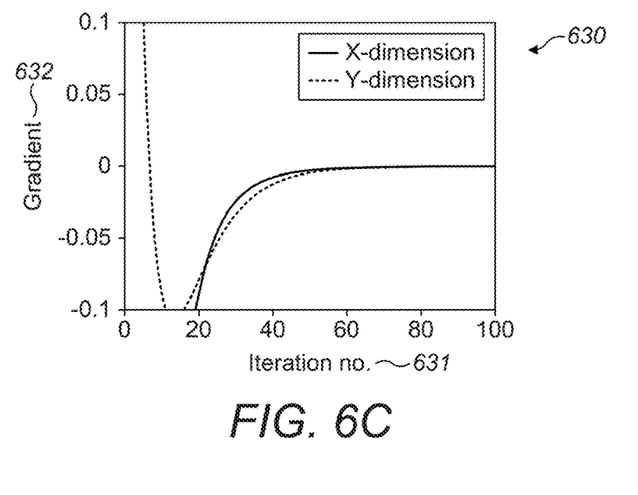

FIGS. 6A, 6B, 6C show numerical simulations performed with 2 anchor nodes and 100 iterations. The benefit of using the proposed algorithms becomes more evident by looking at these results when compared with FIGS. 5A, 5B, 5C.

Specifically, FIG. 6A shows a simulation using "classic" MLAT 610 with the x-axis being the iteration number 611 and the y-axis is the gradient 612. FIG. 5B shows a simulation using Algorithm No. 1 620 with the x-axis being the iteration number 621 and the y-axis is the gradient 622. FIG. 5C shows a simulation using Algorithm No. 2 630 with the x-axis being the iteration number 631 and the y-axis is the gradient 632.

This demonstrates that if classical approach is utilized 610, the algorithm cannot find the global minimum, as the gradient is uncontrolled and not converging in the time. Constraining one dimension 620 causes the gradient to oscillate around the right path, eventually leading to the finding of the global minimum. Utilizing a two-dimensional approach 630 leads to the finding of the global minimum around a more direct path.

Thus, the chance of finding the global minimum are dramatically increased if the proposed algorithms are used.

E. Machine Learning Extensions/Applications

An intelligent system can be trained to return regression and classification models from raw or processed analogue waveforms for source location estimations, using deep learning algorithms. The final aim is to save computational power, by avoiding the expensive algorithms based on gradient descent to run for real-time applications. Raw, acoustic analogue waveforms sensed from up to only two receiving channels can be used as the input for the neural networks. The nature of the problem is primarily time-domain based, and so architectures that are sensible to time are an obvious choice. Nonetheless, architectures that are capable of retaining the spatial relationship between sensors are essential. For these reasons, fully connected, convolutional and recurrent networks are all good candidates.

Figure 7:
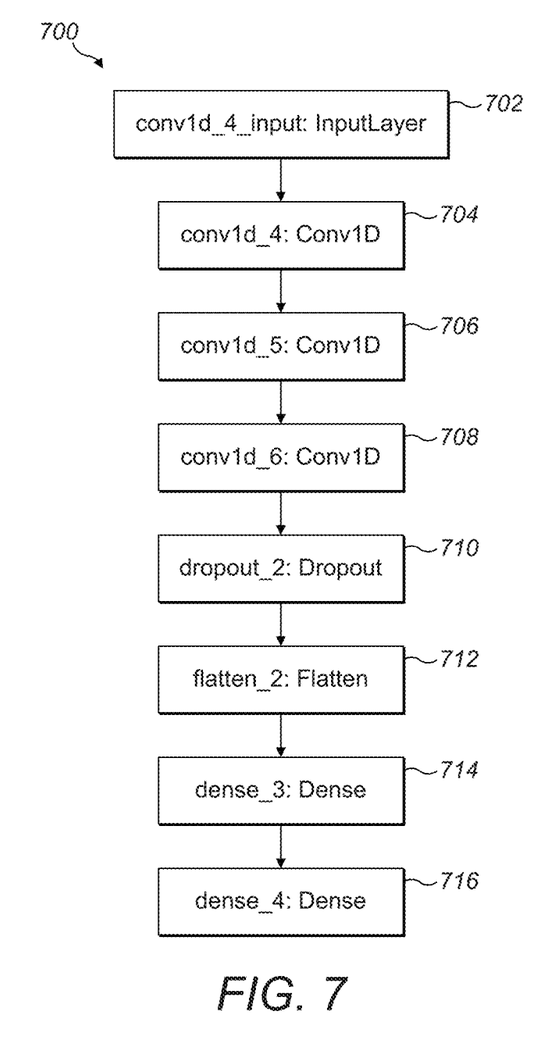
FIG. 7 shows a training algorithm of a regression model for source localization using sound energy.

FIG. 7 displays a neural network's architecture example 700 which can be used to train a regression model for source localization and object tracking using sound energy.

It comprises of an input 1D convolutional layer 70, followed by 3 deep 1D convolutional layers 704, 706, 708, a dropout layer 710, a flatten layer 712 and two dense layers 714, 716. The last dense layer 716 is the output layer. Conventionally, each convolutional layer 704, 706, 708 is followed by a pooling layer, averaging and hence decimating the problem space.

A classification model using raw or processed, acoustic analogue waveforms coming from as few as two receiving channels, can also be trained for classification of the source dynamic and static trajectory in space and time. An application of the aforementioned would be a gesture classifier using acoustic energy. As a user's hand or arm moves following repetitive patterns, the classification model would find the boundaries between different patterns, identifying the gesture type.

F. Other Applications

The same principle of inferring one dimension as the input for the optimizer can be extended to other application. One application is that of a geometry extraction from a point cloud 3D matrix of energy. If one dimension is predominant, it can be fixed or assumed, simplifying the problem to a two-dimensional least square optimization.

G. Additional Disclosure

1. A three-dimensional, source localization algorithm which solves the minimization problem using as few as two receivers.

2. The algorithm of paragraph 1 which constrains one dimension with direct TOF measurements.

3. The algorithm of paragraph 2 which further constrains one dimension with power-based distance estimations.

4. The algorithm of paragraphs 2 and 3 which reduces MLAT to a 2-dimensional, planar problem by using the TOF projected to the perpendicular degrees of freedom and power-based distance estimations.

5. The algorithm of paragraph 1 which uses gradient descent.

6. The algorithm of paragraph 1 which uses Gauss-Newton approach in a least-square sense.

7. The algorithm of paragraph 1 which converges to a solution in the scenario of the various dimensions under consideration are of the same order of magnitude.

8. A three-dimensional, source localization algorithm which uses weighted gradient descent and the power, the correlation coefficient or the amplitude of the received/ demodulated waveforms as the confidence of each anchor node.

9. The application of deep learning architectures for training regression models for source localization using sound energy sensed from as few as two receiving locations.

10. The application of deep leaning architectures for training classification models for dynamic and static source patterns (e.g. gesture recognition) using sound energy coming from as few as two receiving locations.

III. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An system comprising:
an array of transducers for creating a continuous acoustic field having amplitude properties and phase properties at a plurality of control points for mid-air haptics generation and feedback;
wherein the array of transducers are divided into four symmetrical quadrants;
wherein receiving elements are embedded within the array of transducers;
wherein the acoustic field yields recorded waveforms within each of the four symmetrical quadrants; and
wherein the symmetrical quadrants are used to localize an object within the acoustic field.

2. A system as in claim 1, wherein an array subset within the array of transducers in proximity to the receiving elements, are used to generate the acoustic field yielding the recorded waveforms.

3. A system as in claim 2, wherein a covariance calculation is used to harvest signal similarity.

4. A system as in claim 3, wherein a template signal and an excitation signal, is used to determine the covariance calculation with every received waveform.

5. A system as in claim 1, wherein a Pearson correlation coefficient is used to determine similarity of the recorded waveforms.

6. A system in claim 1, wherein an absence of an object is determined from similar values contained in a matrix of correlation coefficient parameters.

7. A system in claim 1 in which the coarse location (in terms of a quadrant) is established from the lag of the minimum mean of the matrix R either along the matrix columns or rows.

8. A system in claim 1, wherein a coarse estimation of an object in terms of one of the symmetrical quadrants can be translated to a (x,y) coordinate pair using a (x,y) coordinates of the receiving element within the one of the symmetrical quadrants.

9. A system as in claim 1, wherein the receiving elements are at corners of the array of transducers for increased acoustic field coverage beyond the array of transducers.

10. A method comprising:
a three-dimensional source localization algorithm for an array of transducers for creating a continuous acoustic field having amplitude properties and phase properties at a plurality of control points for mid-air haptics generation and feedback;
wherein the algorithm uses weighted gradient descent and power, correlation coefficient or amplitude of a received and demodulated waveforms as the confidence of at least one receiver within three-dimensional locations.

11. The method as in claim 10, wherein the at least one receiver is at least two receivers.

12. The method as in claim 11 further comprising: constraining one dimension with direct time-of-flight measurements.

13. The method as in claim 12, further comprising: further constraining the one dimension with power-based distance estimations.

14. The method as in claim 12, further comprising: reducing multilateration to a 2-dimensional, planar problem by using the time-of-flight measurement projected to perpendicular degrees of freedom and power-based distance estimations.

15. The method as in claim 11, wherein the algorithm uses gradient descent.

16. The method as in claim 11, wherein the algorithm uses Gauss-Newton approach in a least-square sense.

17. The method as in claim 11, wherein the algorithm converges to a solution if various dimensions under consideration are of the same order of magnitude.

18. The method as in claim 11, wherein the algorithm uses deep learning architectures for training regression models for source localization using sound energy sensed from at least two receiving locations.

19. The method as in claim 18, wherein the deep leaning architectures comprises training classification models for dynamic and static source patterns using sound energy from at least two receiving locations.

* * * * *